US007914690B2

(12) United States Patent
Wu et al.

(10) Patent No.: US 7,914,690 B2
(45) Date of Patent: Mar. 29, 2011

(54) METHOD FOR MANUFACTURING METALLIC PANEL HAVING RIPPLE LUSTER

(75) Inventors: Che-Tung Wu, Taoyuan (TW); Chih-Ho Hsu, Taoyuan (TW); Kai-Jie Taso, Taoyuan (TW)

(73) Assignee: Ichia Technologies, Inc., Taoyuan (TW)

( * ) Notice: Subject to any disclaimer, the term of this patent is extended or adjusted under 35 U.S.C. 154(b) by 758 days.

(21) Appl. No.: 11/946,527

(22) Filed: Nov. 28, 2007

(65) Prior Publication Data

US 2009/0114334 A1 May 7, 2009

(30) Foreign Application Priority Data

Nov. 7, 2007 (TW) ............................... 96142047 A

(51) Int. Cl.
*B23P 15/00* (2006.01)
*C03C 25/00* (2006.01)
*C23F 1/00* (2006.01)

(52) U.S. Cl. ............................... 216/39; 216/32; 29/622

(58) Field of Classification Search .................... 216/39, 216/32; 29/622

See application file for complete search history.

(56) References Cited

U.S. PATENT DOCUMENTS

2003/0043995 A1 * 3/2003 Wolfe et al. .................. 379/368
2009/0133997 A1 * 5/2009 Kato et al. .................... 200/293
2009/0236209 A1 * 9/2009 Ishii ............................. 200/341

FOREIGN PATENT DOCUMENTS

JP 2007-134071 5/2007

* cited by examiner

*Primary Examiner* — Roberts Culbert
(74) *Attorney, Agent, or Firm* — Chun-Ming Shih; HDLS IPR Services

(57) ABSTRACT

A method for manufacturing a metallic keypad panel having a ripple luster. First, a metallic thin plate is prepared. The metallic thin plate is subjected to an etching process, thereby forming a plurality of hollowed portions on the metallic thin plate. The hollowed portions are used to define a pressing region for the keypad and icons for the surface of the pressing region. The metallic thin plate is cut to form a metallic keypad panel having a predetermined shape. An electroplated layer is coated on the surface of the metallic keypad panel. Then, a layer of protective film is adhered on one side surface of the metallic keypad panel. The metallic keypad panel is disposed into a transparent mold. After an ultraviolet curable resin is injected into the mold, a light source illuminates the transparent mold to cure the ultraviolet curable resin in the mold to form a pattern layer. Finally, after the protective film on the other surface of the metallic keypad panel is peeled off, an adhesive layer is applied on the other surface of the metallic keypad panel. An elastic layer having a plurality of protrusions is adhered on the surface of the adhesive layer. Via the above steps, the metallic keypad panel is manufactured completely.

9 Claims, 13 Drawing Sheets

METHOD FOR MANUFACTURING METALLIC PANEL HAVING RIPPLE LUSTER

BACKGROUND OF THE INVENTION

1. Field of the Invention

The present invention relates to a keypad panel, and in particular to a method for manufacturing a metallic panel.

2. Description of Prior Art

Keypad panel has become a necessary hardware for a portable mobile device. The surface of the keypad cap of each keypad on the keypad panel is provided with numerals, characters, phonetic symbols, roots for an input method and various functional icons, so that a user can input operational instructions to control various functions of the portable mobile device. Therefore, for a portable mobile device, the keypad panel is a very important input means.

For example, a conventional metallic keypad panel is shown in FIGS. 1(*a*) to 1(*f*) (Japanese Laid-Open Patent Publication No. 2007-134071). In manufacturing the metallic keypad panel 10*a* disclosed in FIG. 1, a metallic plate 1*a* is prepared first, and the metallic plate 1*a* is attached on a transparent plastic film 2*a*. Then, the metallic plate 1*a* is made to have a hollowed portion 3*a*. The surface of the metallic plate 1*a* is formed with a transparent resin layer 4*a*. The bottom of the transparent plastic film 2*a* is formed with a transparent elastic layer 5*a*. In manufacturing the transparent elastic layer 5*a*, via a hot pressing process, the transparent plastic film 2*a* and the transparent elastic layer 5*a* are compressed into the hollowed portion 3*a* together, thereby forming a separating line 21*a* for separating the metallic keypads. Then, a light-emitting layer 6*a* is attached to the bottom of the transparent elastic layer 5*a*.

In manufacturing the above metallic keypad panel 10*a*, since the transparent plastic film 2*a* and the transparent elastic layer 5*a* are compressed into the hollowed portion 3*a* together, the pressing force and the heating temperature should be properly controlled during the hot pressing process. Otherwise, the transparent plastic film 2*a* and the transparent elastic layer 5*a* cannot be compressed into the hollowed portion 3*a* completely, causing defective products. Even, during the process of compressing the transparent plastic film 2*a* and the transparent elastic layer 5*a* into the hollowed portion 3*a*, the transparent plastic film 2*a* may rub and pull the wall faces and chamfers of the hollowed portion 3*a*, causing the breakage of the transparent plastic film 2*a* easily and the difficulty in manufacture.

Next, gaps are generated easily between the transparent plastic film 2*a* compressed into the hollowed portion 3*a* and the wall face of the hollowed portion 3*a*. The gaps may be filled by dusts or penetrated by liquid, so that the metallic keypads cannot be pressed smoothly or an internal short circuit may occur.

Further, the surface of the transparent resin layer 4*a* formed on the metallic plate 1*a* is a flat surface, which merely provides a protective effect for the metallic plate 1*a* without any reflective effect of a particular luster. Therefore, the external appearance and the overall visual effect of the metallic keypad panel 10*a* are dull.

SUMMARY OF THE INVENTION

In view of the above drawbacks, the present invention is to provide a novel and simple method for manufacturing a metallic keypad panel that allows the metallic keypad panel to be manufactured easily while making the surface of the metallic keypad panel to have a reflective effect of a ripple luster.

The present invention is to provide a method for manufacturing a metallic panel having a ripple luster. First, a metallic thin plate is prepared. The metallic thin plate is subjected to an etching process, thereby forming a plurality of hollowed portions on the metallic thin plate. The hollowed portions are used to define a pressing region for the keypad and icons for the surface of the pressing region. After cutting the etched metallic thin plate having the hollowed portions, a keypad panel having a predetermined shape is formed. Then, the completely cut keypad panel is subjected to an electroplating process in an electroplating tank, thereby coating an electroplated layer on the surface of the keypad panel. After the electroplating of the metallic keypad panel is completed, a layer of protective film is adhered on the non-electroplated surface of the metallic keypad panel. Then, the metallic keypad panel adhered with the protective film is disposed into a transparent mold. An ultraviolet curable resin is injected into the mold, so that the ultraviolet curable resin can be attached on the surface of the electroplated layer and the hollowed portion. Further, the pattern in the inner surface of the mold makes the ultraviolet curable resin to form a pattern accordingly. Then, a light source illuminates the transparent mold to cure the ultraviolet curable resin in the mold to form a pattern layer. Finally, after the protective film on one surface of the metallic keypad panel is peeled off, an adhesive layer is applied on the non-electroplated surface of the metallic keypad panel. An elastic layer having a plurality of protrusions is adhered on the surface of the adhesive layer. Via the above steps, the manufacturing of the metallic keypad panel is completed.

DETAILED DESCRIPTION OF THE INVENTION

The detailed description and the technical contents of the present invention will be explained with reference to the accompanying drawings.

Figure 1:
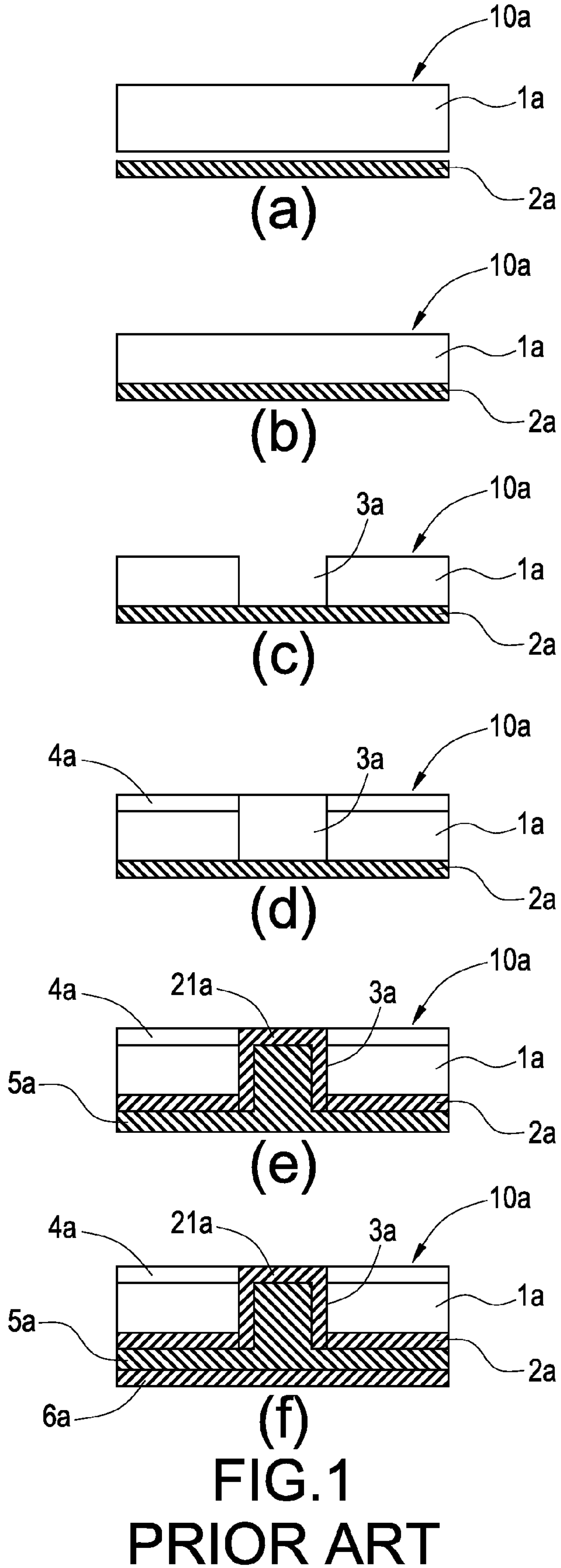
FIG.1 PRIOR ART
FIGS. 1(*a*) to 1(*f*) are structural views showing a procedure for manufacturing a traditional metallic keypad panel.
Figure 2:
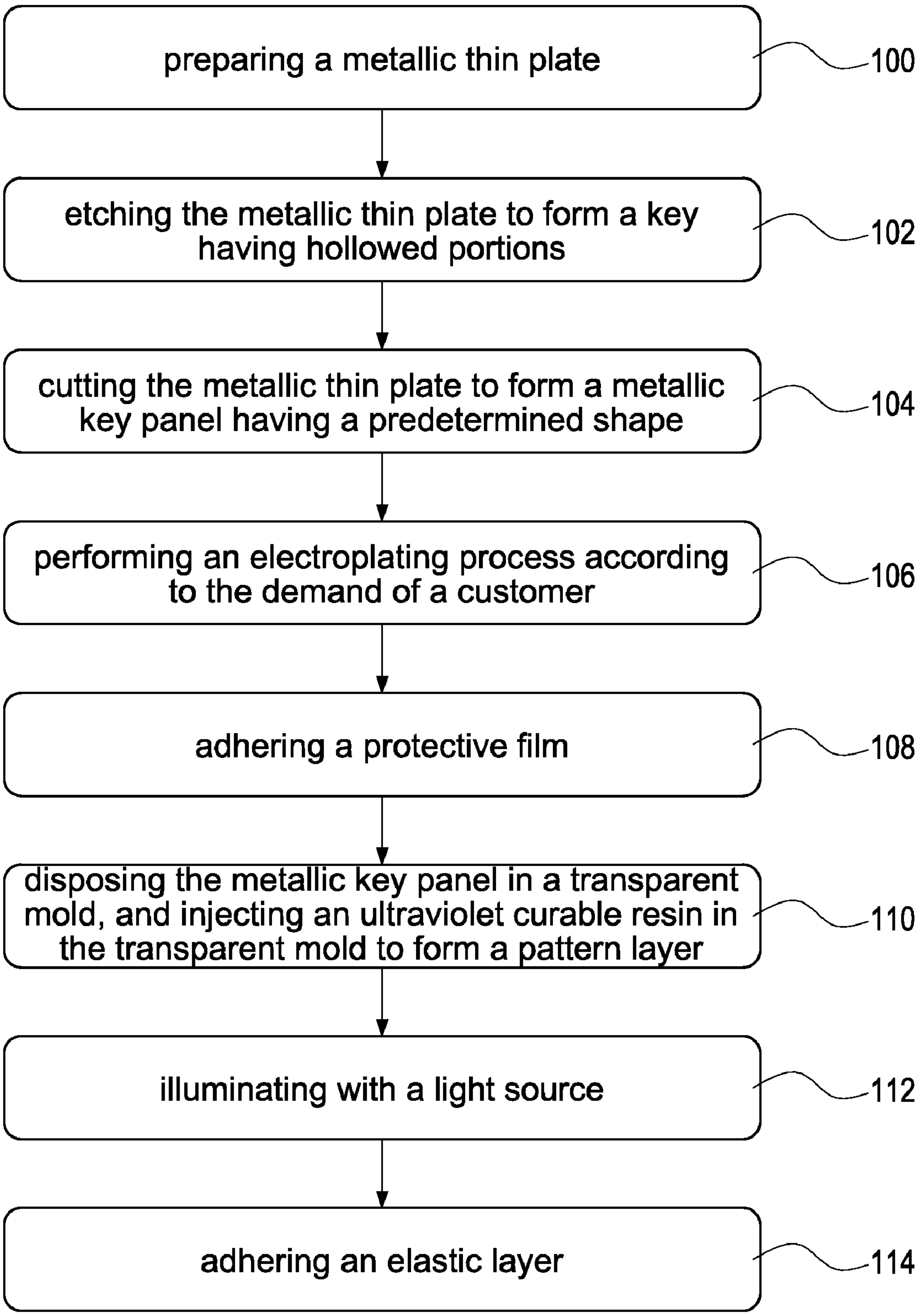
FIG. 2 is a schematic view showing the procedure for manufacturing a metallic keypad panel of the present invention.
Figure 3A:
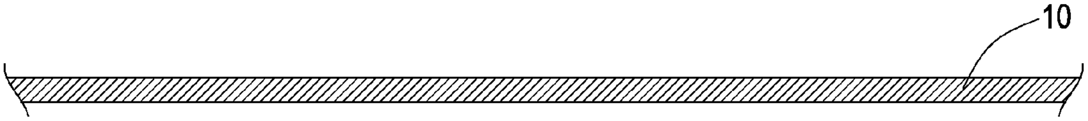
FIGS. 3(*a*) to 3(*k*) are structural views showing the procedure for manufacturing a metallic keypad panel of the present invention.
Figure 3B:
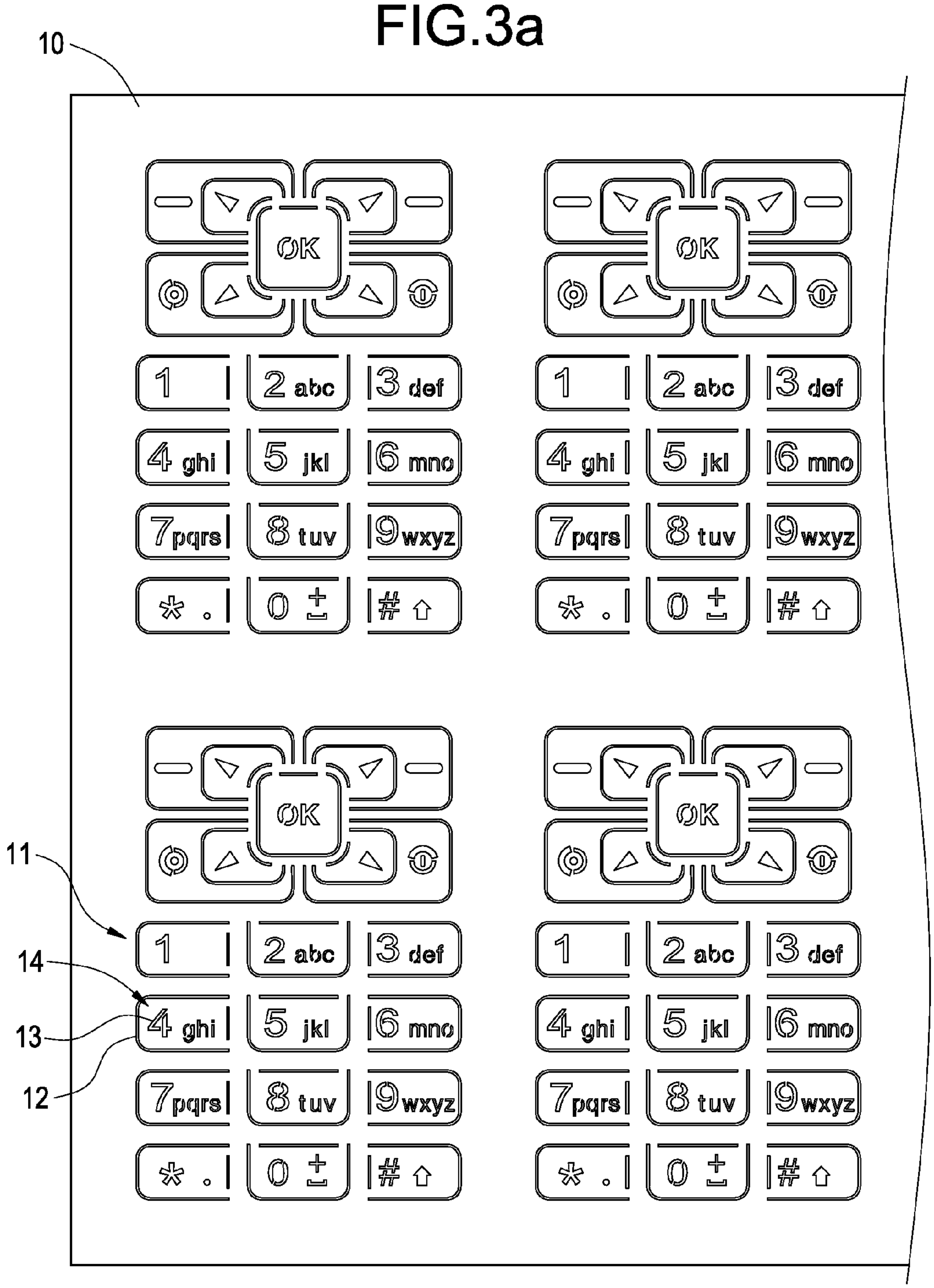
Figure 3C:
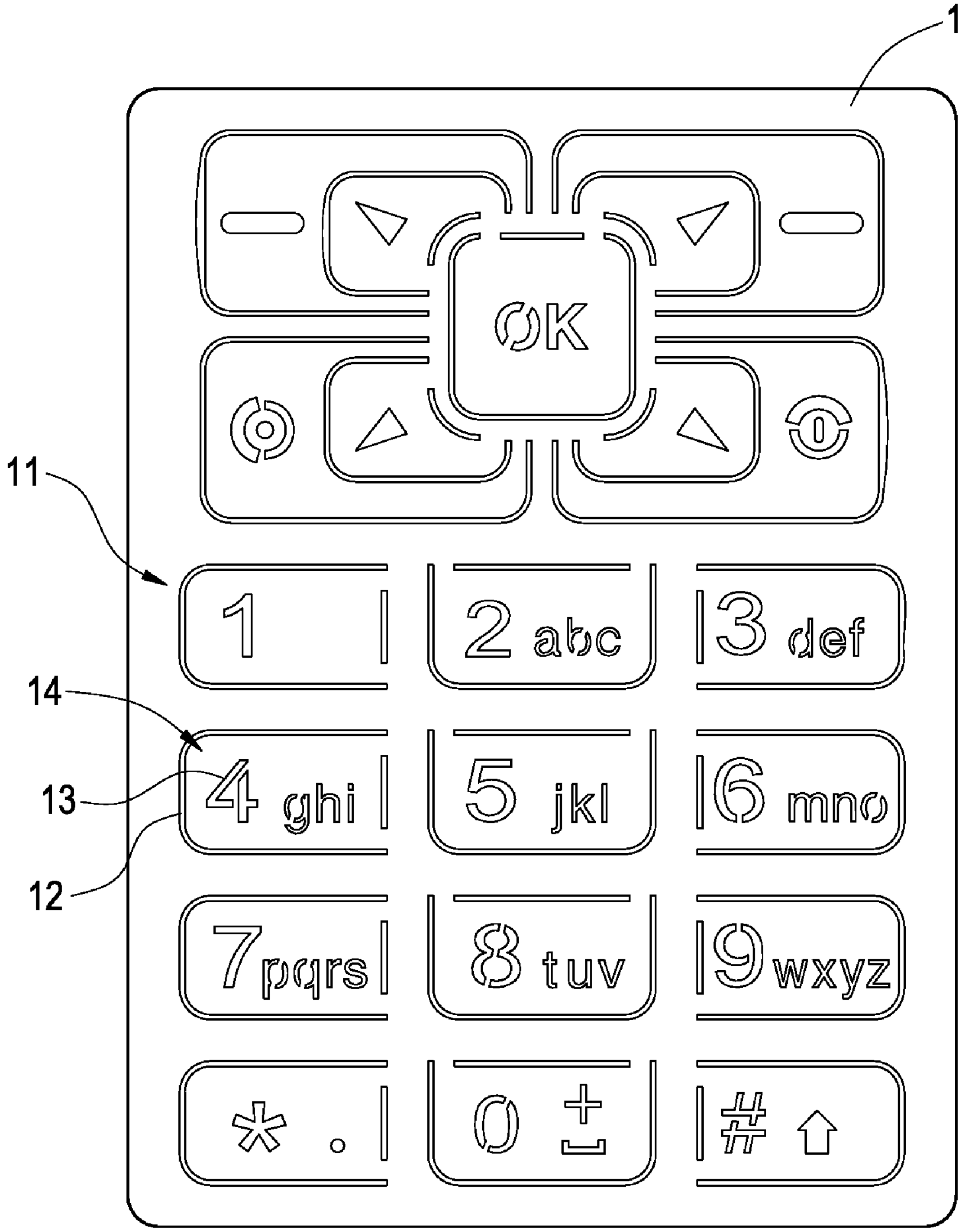
Figure 3D:
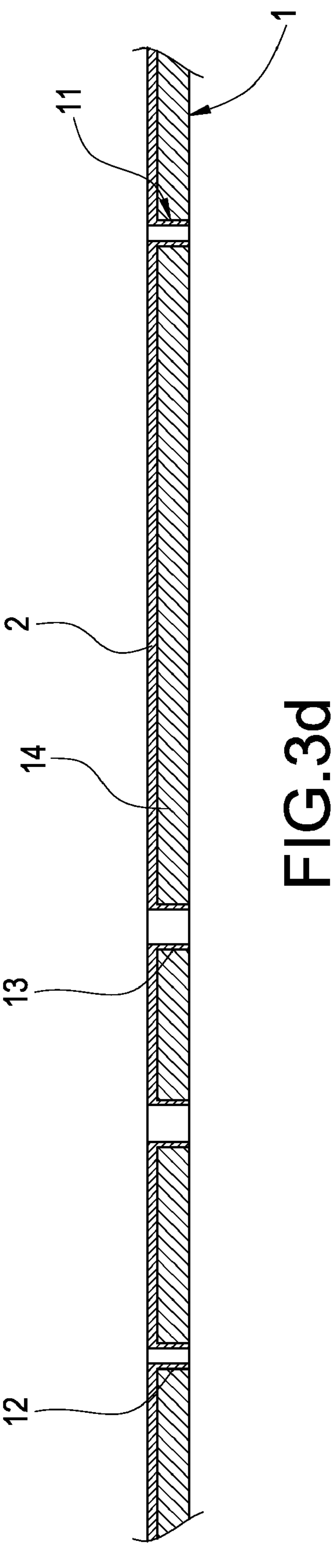
Figure 3E:
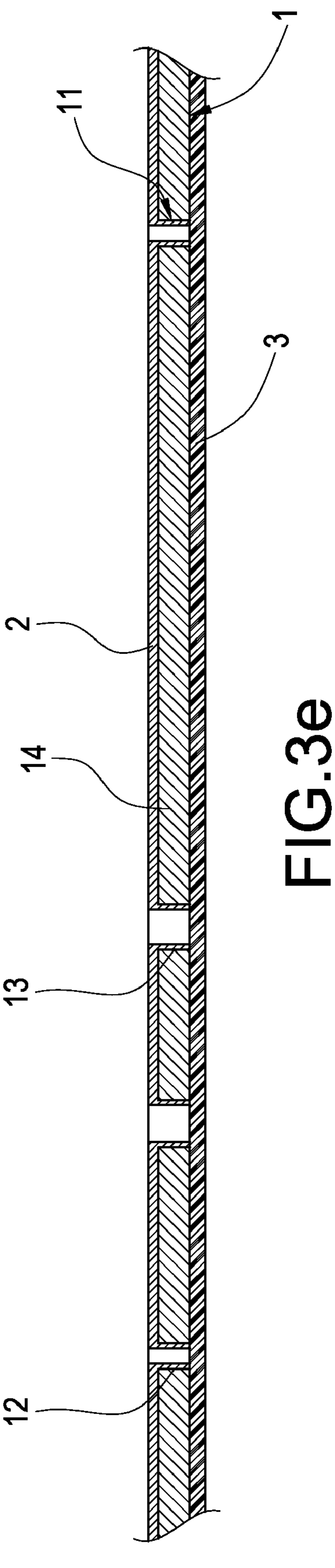
Figure 3F:
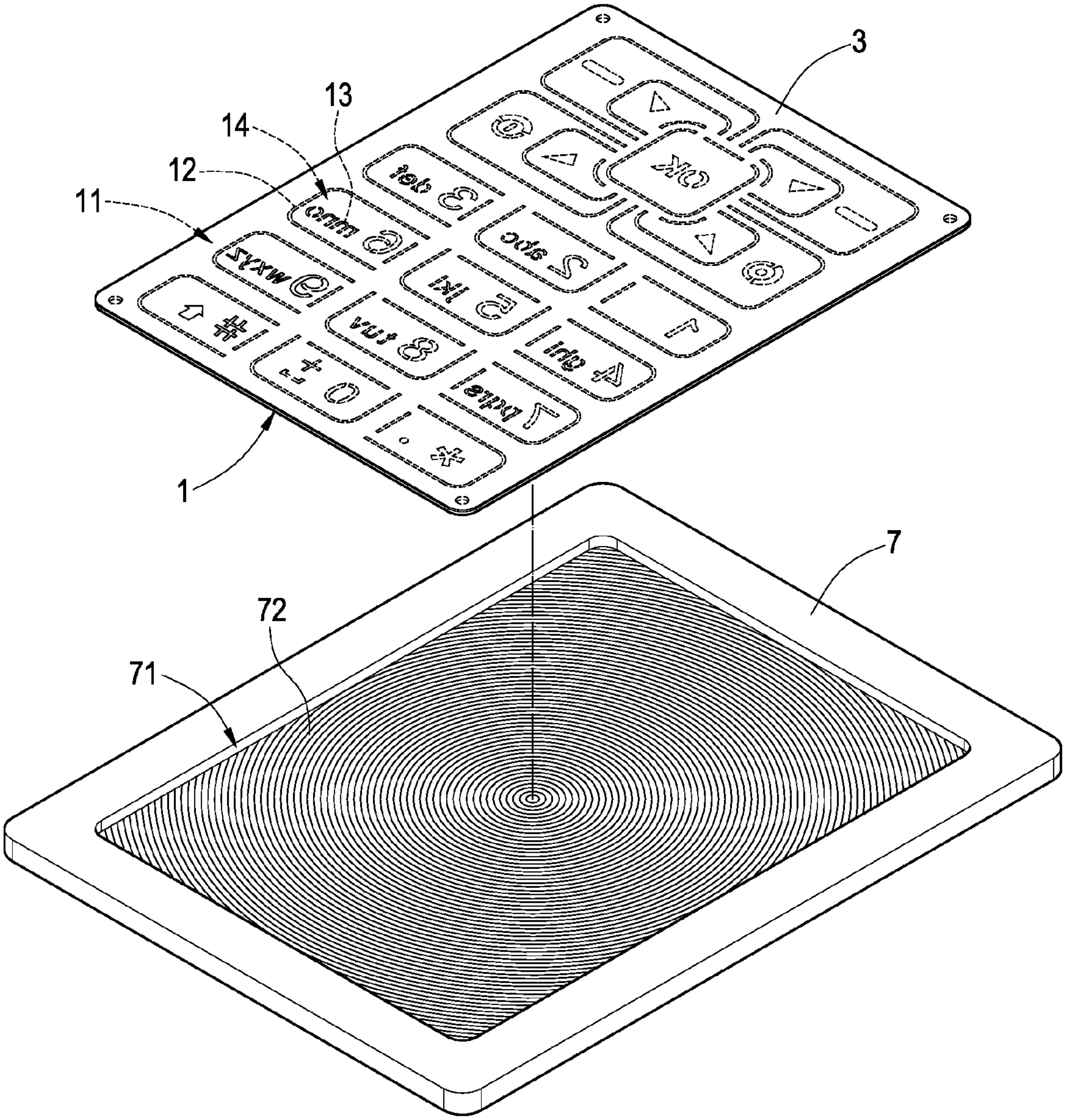
Figure 3G:
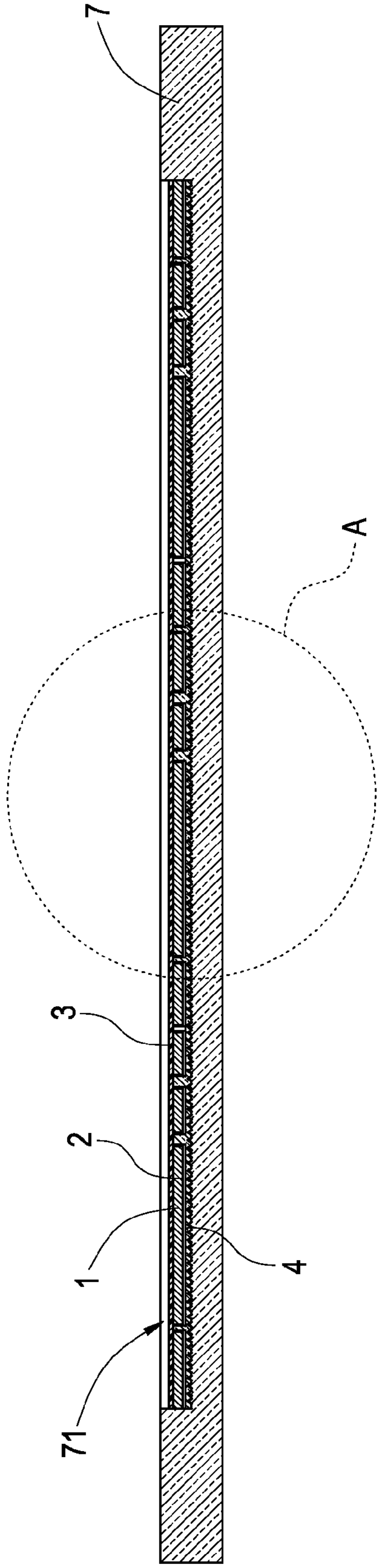
Figure 3H:
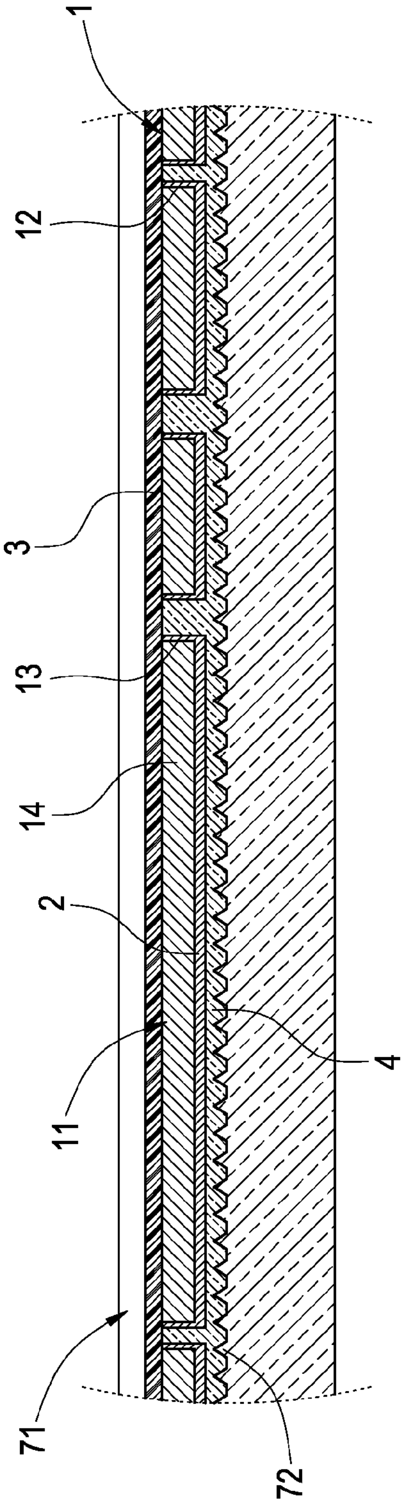
Figure 3I:
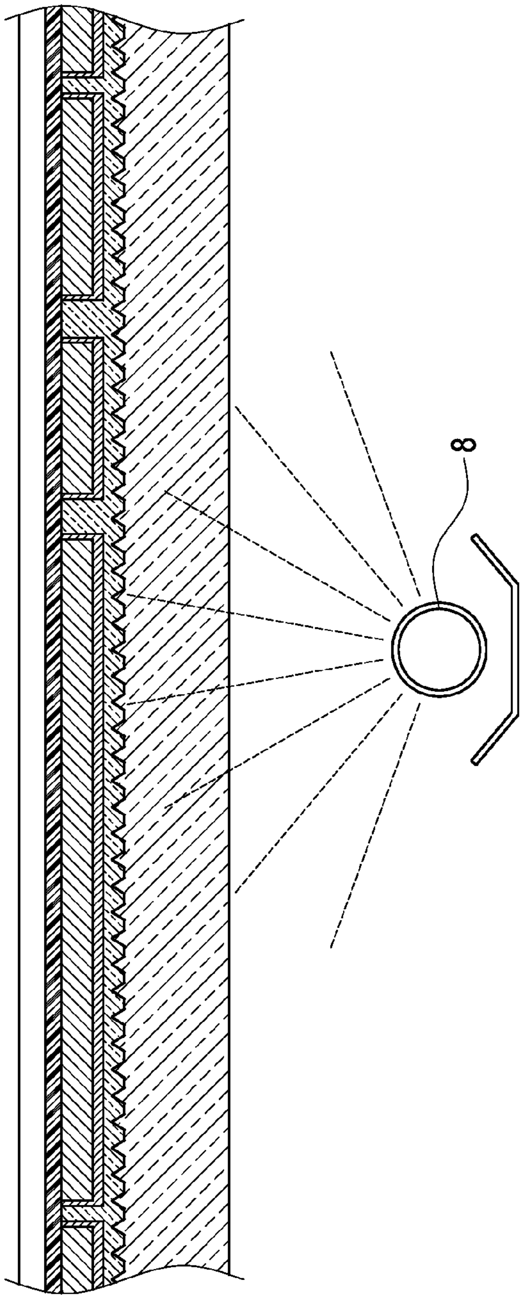
Figure 3J:
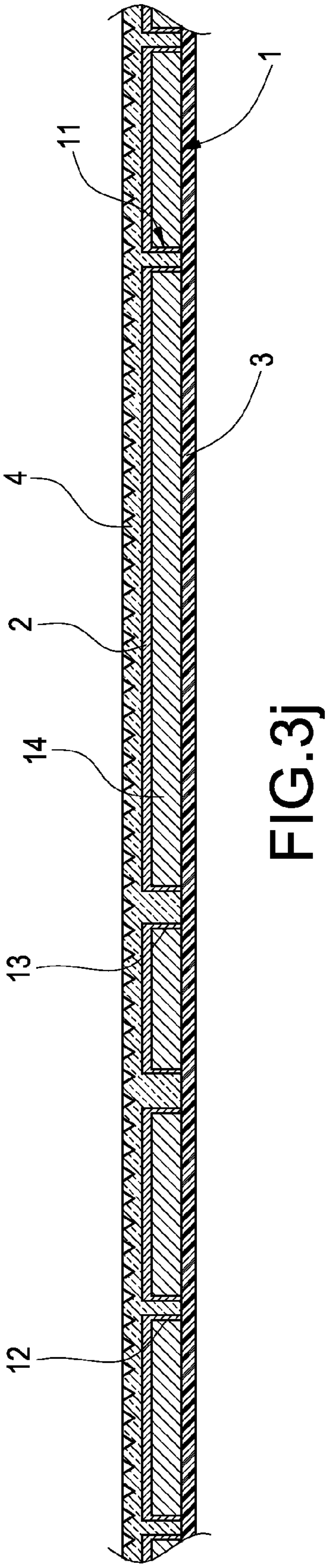
Figure 3K:
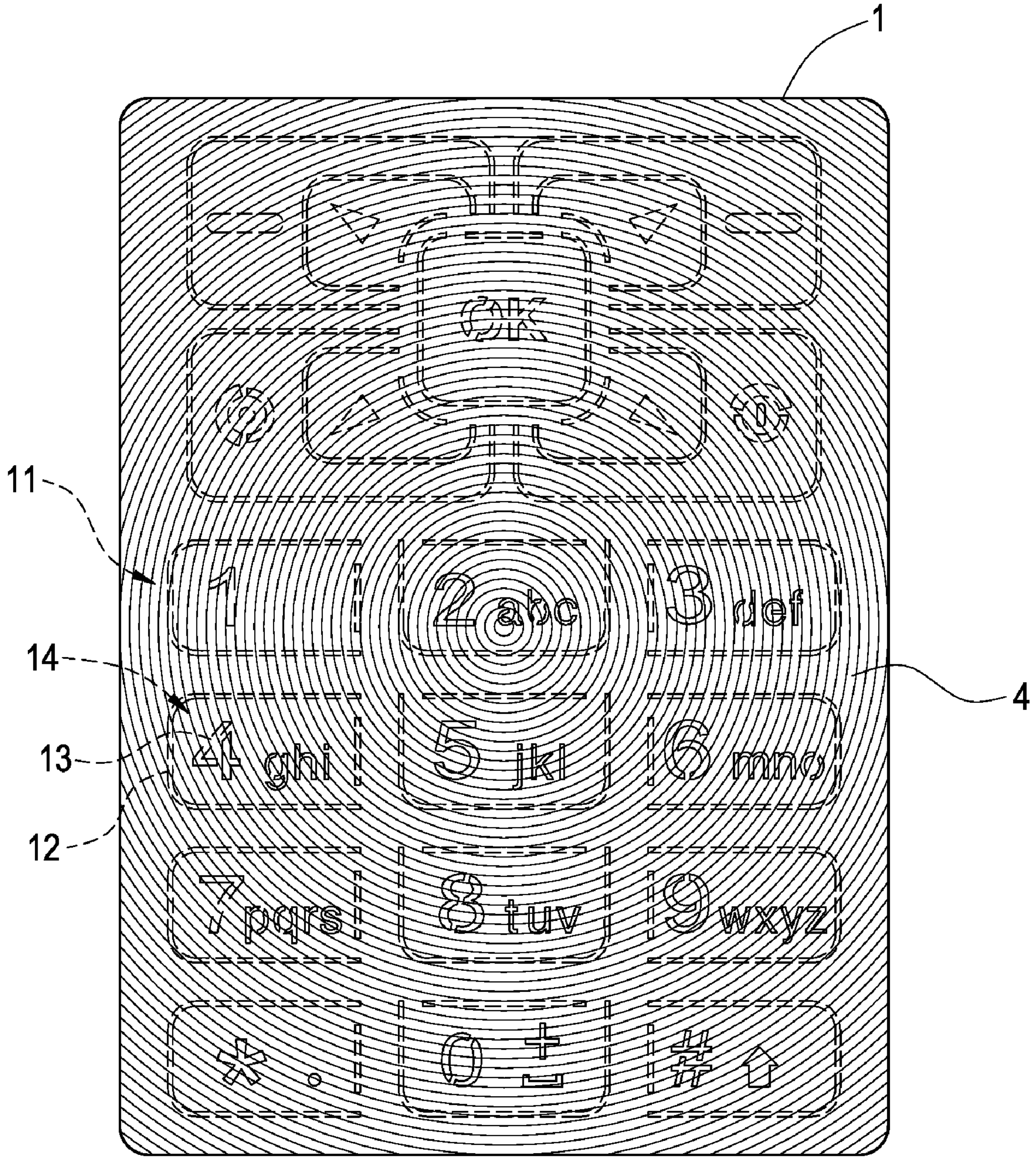
Figure 3I:
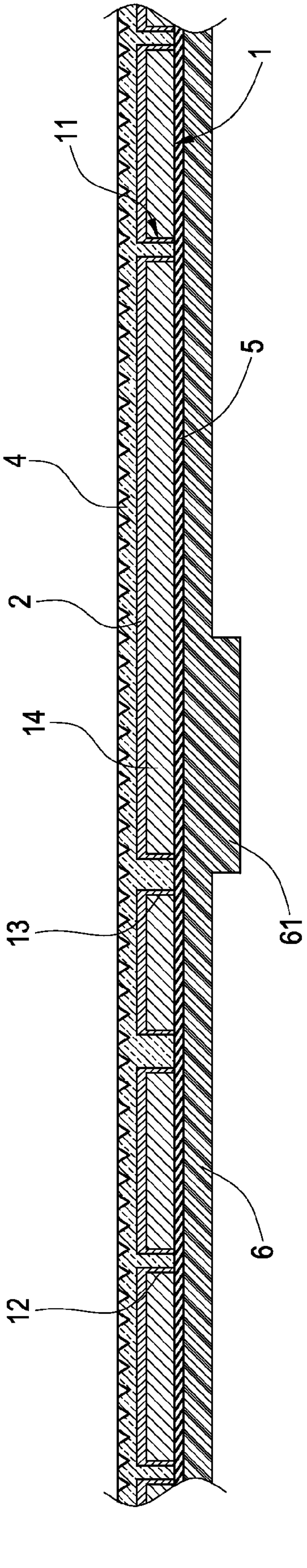

With reference to FIG. 2, it is a schematic view showing the procedure for manufacturing a metallic keypad panel of the present invention. As shown in this figure, the present invention provides a method for manufacturing a metallic keypad panel having a ripple luster. In manufacturing the metallic keypad panel (please also refer to FIG. 3), first, in a step 100, a metallic thin plate 10 is prepared as shown in FIG. 3(*a*). The metallic thin plate 10 is made of stainless steel (SUS) or Al—Mg alloy.

In a step 102, an etching process is performed. The metallic thin plate 10 is subjected to the etching process, so that the metallic thin plate 10 is formed thereon with a plurality of hollowed portions 11. The hollowed portions 11 are classified into first hollowed portions 12 and second hollowed portions 13. The first hollowed portion 12 has a linear shape to enclose a pressing region 14 of a keypad, and the second hollowed portion 13 is set as an icon on the surface of the pressing region 14. As shown in FIG. 3(*b*), the icons includes numerals (0 to 9), characters (A to Z), special symbols (e.g., "#", "*", "." dialing icon, ending icon and etc.), and navigational symbols.

In a step 104, a cutting process is performed. The etched metallic thin plate 10 having the hollowed portions 11 is cut to form a metallic keypad panel 1 having a predetermined shape, as shown in FIG. 3(*c*).

In a step 106, an electroplating process is performed. The completely cut metallic keypad panel 1 is electroplated in an electroplating tank, thereby forming an electroplated layer 2 on the surface of the metallic keypad panel 1 and the wall face of the hollowed portion 11, as shown in FIG. 3(*d*). According to the demand of a customer, the electroplated layer 2 can be processed to coat a layer of metallic such as nickel on the surface of the metallic keypad panel 1.

In a step 108, adhesion of a protective film is performed. After the electroplating process of the metallic keypad panel 1 is completed, as shown in FIG. 3(*e*), a layer of protective film 3 is adhered on the non-electroplated surface of the metallic keypad panel 1. Thereby, in subsequent processes, the non-electroplated surface of the metallic keypad panel 1 can be prevented from suffering contamination or damage (scrapes).

In a step 110, the metallic keypad panel 1 adhered with the protective film 3 is disposed in a transparent mold 7. Then, an ultraviolet curable resin is injected into a cavity 71 of the transparent mold 7, so that the ultraviolet curable resin can be adhered on the surface of the electroplated layer 2 and the hollowed portion 11 as shown in FIGS. 3(*f*) to 3(*h*).

In a step 112, after the ultraviolet curable resin is injected into the mold 7, an illumination of a light source 8 is performed to cure the ultraviolet curable resin. In this way, the pattern 72 on the inner surface of the cavity 71 of the transparent mold 7 makes the ultraviolet curable resin to form a pattern layer 4 as shown in FIGS. 3(*f*), 3(*i*) and 3(*j*). As a result, the pattern layer 4 becomes a spinning having a ripple luster. Further, the pattern layer 4 forms a protective layer for the metallic keypad panel 1.

In a step 114, an elastic layer is adhered on the metallic keypad panel 1. After the pattern layer 4 is made on the surface of the metallic keypad panel 1 completely, the protective film 3 on the other surface of the metallic keypad panel 1 is peeled off. Then, the non-electroplated surface of the metallic keypad panel 1 is coated with an adhesive layer 5. An elastic layer 6 having a plurality of protrusions 6 is adhered to the surface of the adhesive layer 5, so that the metallic keypad panel 1 and the elastic layer 6 are combined with each other, as shown in FIG. 3(*k*). Via the above steps, the manufactured of the metallic keypad panel 1 is completed.

Figure 4:
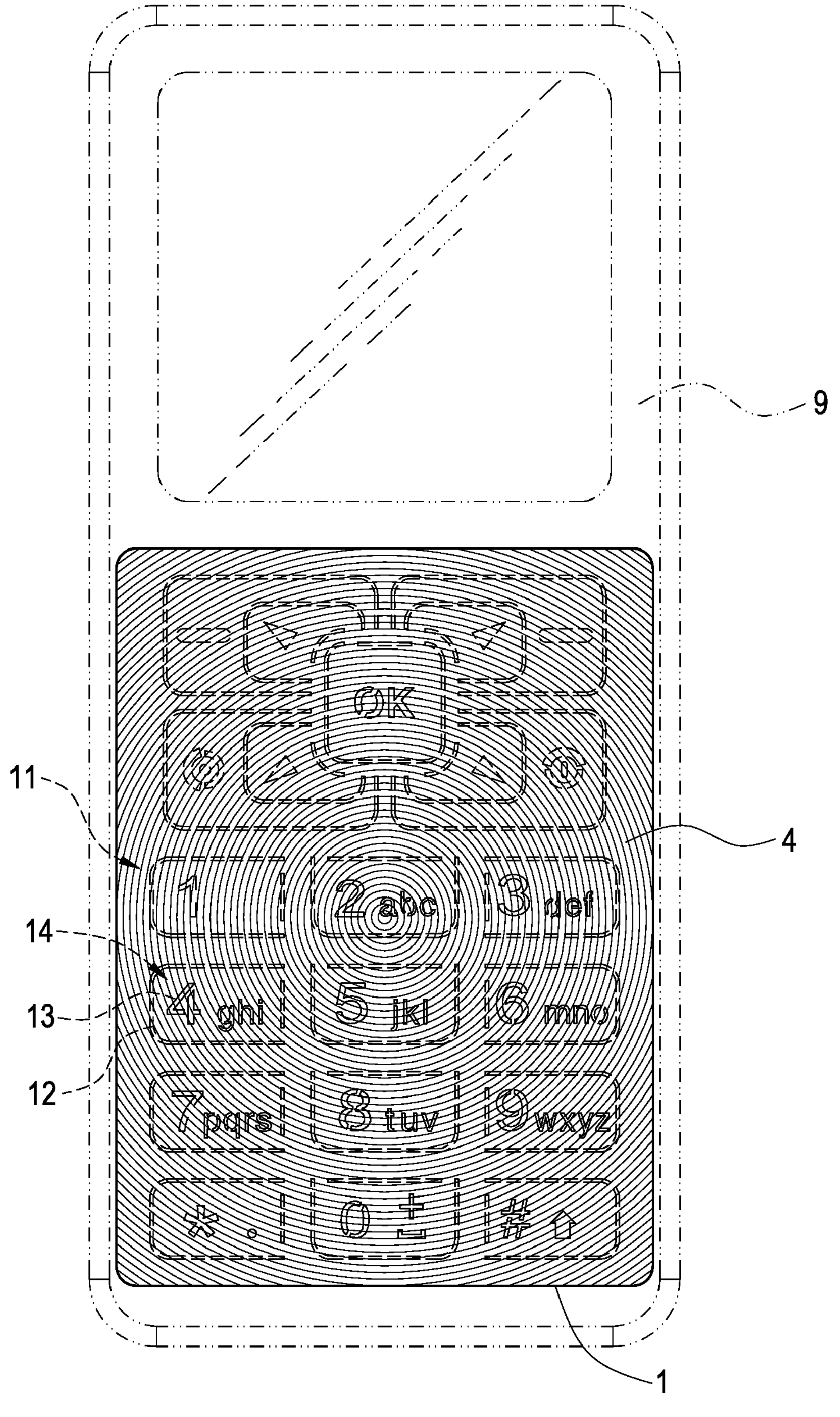
FIG. 4 is a schematic view showing the metallic keypad panel of the present invention being used in a mobile phone.

With reference to FIG. 4, it is a schematic view showing the metallic keypad panel of the present invention being used in a mobile phone. As shown in this figure, after the metallic keypad panel 1 of the present invention is manufactured completely, it can be applied to a mobile phone 9. When the external light illuminates the pattern layer 4 of the metallic keypad panel 1, the pattern layer 4 generates a reflective effect of a ripple luster, thereby increasing the aesthetic feeling of the mobile phone 9. Further, the pattern layer 4 can protect the surface of the metallic keypad panel 1 from suffering damage due to outside rigid objects.

Figure 5:
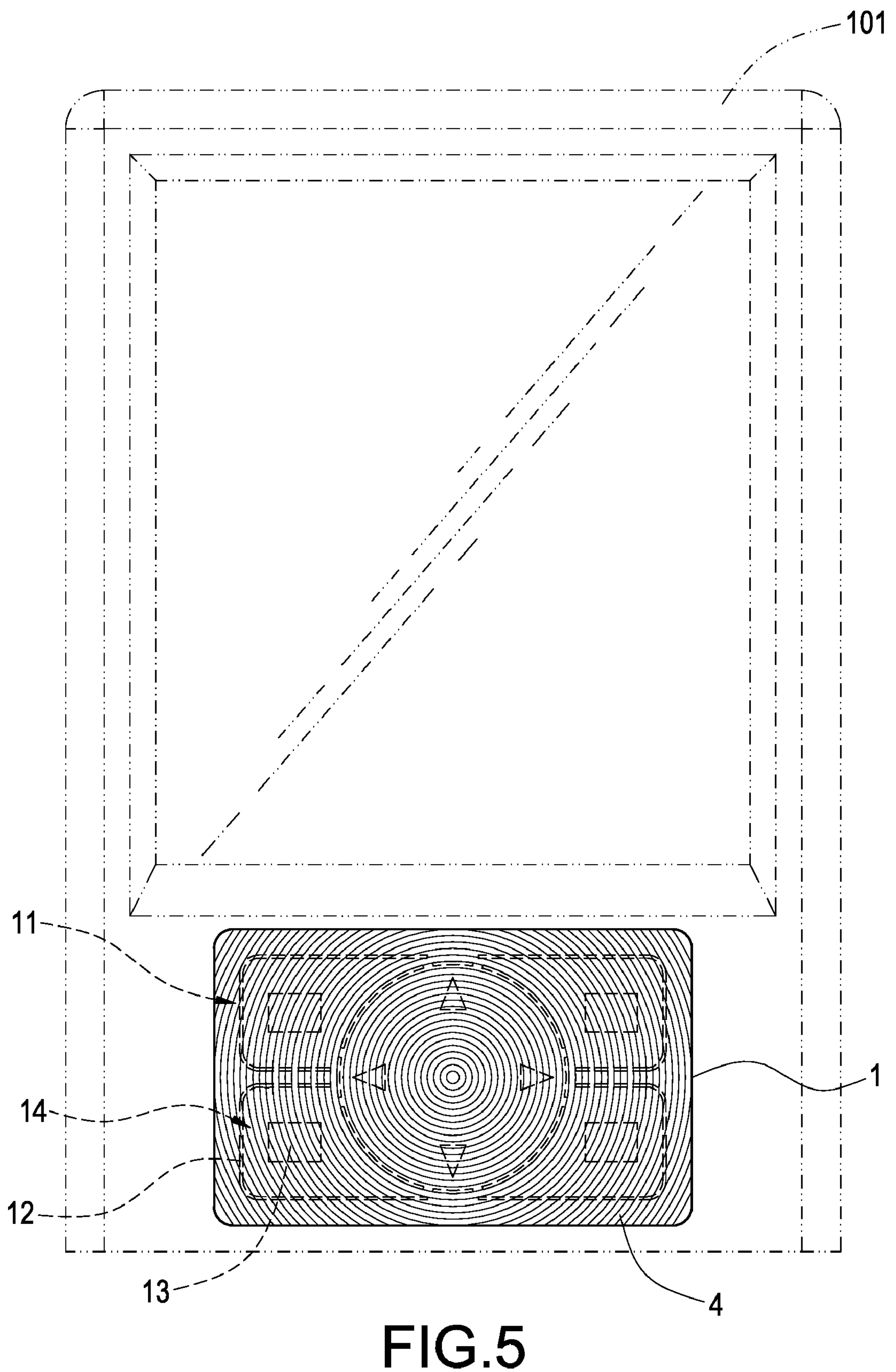
FIG. 5 is a schematic view showing the metallic keypad panel of the present invention being used in a personal digital assistant (PDA)

With reference to FIG. 5, it is a schematic view showing the metallic keypad panel of the present invention being used in a personal digital assistant (PDA). As shown in this figure, after the metallic keypad panel 1 of the present invention is manufactured completely, in addition to the mobile phone 9, it can be applied to a personal digital assistant (PDA) 101. When the light illuminates the pattern layer 4 of the metallic keypad panel 1, the pattern layer 4 generates a reflective effect of a ripple luster, thereby increasing the aesthetic feeling of the personal digital assistant (PDA) 101.

Figure 6:
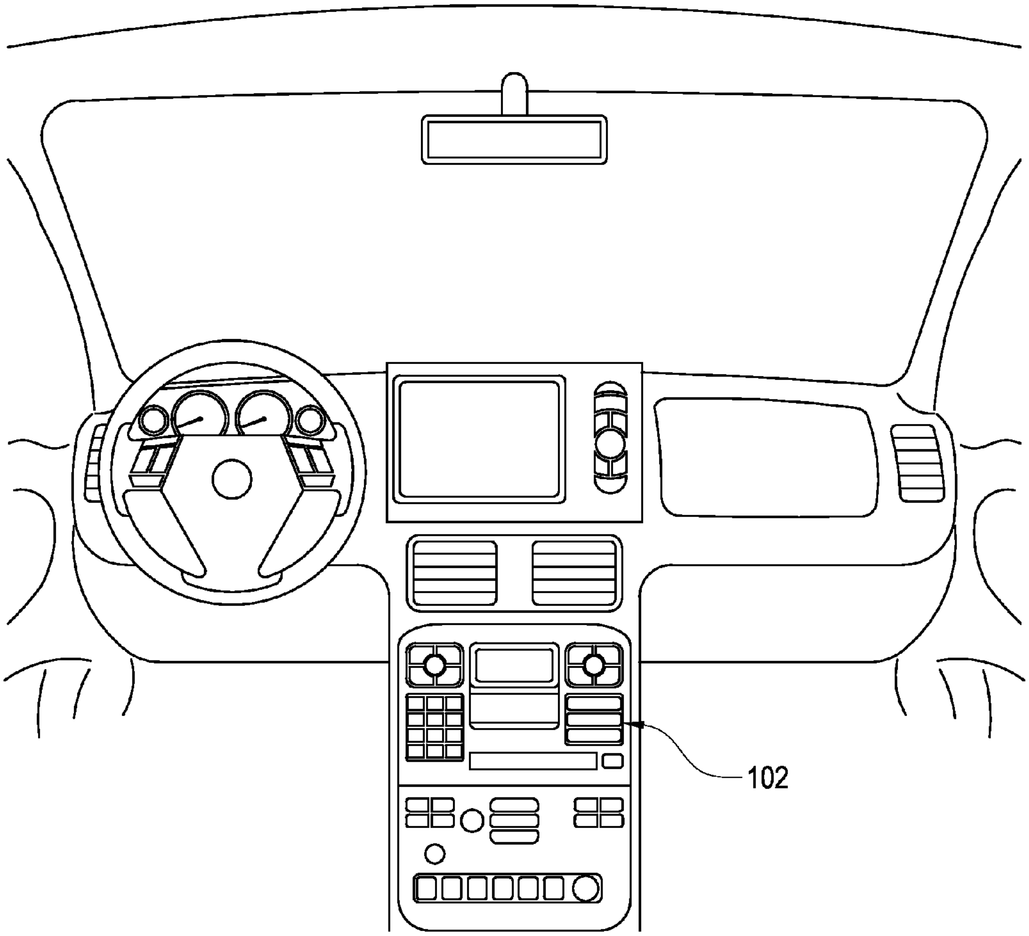
FIG. 6 is a schematic view showing the metallic keypad panel of the present invention being used in an automobile stereo panel.

With reference to FIG. 6, it is a schematic view showing the metallic keypad panel of the present invention being used in an automobile stereo panel. As shown in this figure, in addition to the mobile phone 9 and the personal digital assistant (PDA) 101, the metallic keypad panel of the present invention can be mounted in an automobile stereo panel 102, thereby controlling the operations of an air conditioning system, audio-video system and satellite navigation system.

Further, the electroplated layer 2 can be made according to the demand of the customer. If the customer does not need the electroplated layer 2, the pattern layer 4 can be made directly on one side surface of the metallic keypad panel 1.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A method for manufacturing a metallic panel having a ripple luster, the metallic panel being arranged on a surface of an electronic device, the method comprising the steps of:

(a) preparing a metallic thin plate;

(b) etching the metallic thin plate so as to form a plurality of first and second hollowed portions on the metallic thin plate, wherein each first hollowed portion encircles a pressing region and at least one second hollowed portion forms an icon in the pressing region;

(c) cutting the metallic thin plate so as to form a keypad panel having a predetermined shape;

(d) disposing the metallic keypad panel into a cavity of a transparent mold, wherein a spinning pattern is formed on an inner surface of the cavity;

(e) injecting an ultraviolet curable resin into the cavity of the transparent mold so that the resin is filled in the first and the second hollowed portions; and (f) illuminating with a light source to make the ultraviolet curable resin to form a pattern layer with the spinning pattern on entire surface of the keypad panel.

2. The method according to claim 1, wherein the metallic thin plate prepared in the step (a) is made of stainless steel (SUS) or Al—Mg alloy.

3. The method according to claim 1, wherein the icons comprise numerals, characters, special symbols, and navigational symbols.

4. The method according to claim 1, wherein an electroplated layer is coated on the surface of the metallic keypad panel prior to the step (d).

5. The method according to claim 4, wherein the electroplated layer is made of a metallic material.

6. The method according to claim 1, wherein a layer of protective film is adhered on either surface of the metallic keypad panel prior to the step (d).

7. The method according to claim 1, wherein the pattern layer forms a protective layer for the metallic keypad panel.

8. The method according to claim 1, wherein an adhesive layer is applied on one surface of the metallic keypad panel after the step (f), and then an elastic layer is adhered on the surface of the adhesive layer, thereby combining the metallic keypad panel with the elastic layer.

9. The method according to claim 8, wherein the elastic layer has a plurality of protrusions thereon.

* * * * *